United States Patent
Hind et al.

(10) Patent No.: US 6,715,129 B1
(45) Date of Patent: Mar. 30, 2004

(54) ACHIEVING APPLICATION-SPECIFIC DOCUMENT CONTENT BY TRANSCODING USING JAVA SERVER PAGES

(75) Inventors: John Raithel Hind, Raleigh, NC (US); David B. Lindquist, Raleigh, NC (US); Brad B. Topol, Raleigh, NC (US); Ajamu A. Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/417,880

(22) Filed: Oct. 13, 1999

(51) Int. Cl.[7] .......................... G06F 17/27; G06F 15/00
(52) U.S. Cl. .................... 715/513; 715/501.1; 715/522; 715/505; 717/116
(58) Field of Search ............................. 707/501, 501.1, 707/523, 513; 715/513, 507, 522, 505; 717/116

(56) References Cited

U.S. PATENT DOCUMENTS

| | | | |
|---|---|---|---|
| 6,023,714 A | * 2/2000 | Hill et al. ............... | 715/513 |
| 6,138,156 A | * 10/2000 | Fletcher et al. ........... | 709/224 |
| 6,173,288 B1 | * 1/2001 | Diedrich et al. .......... | 707/102 |
| 6,336,124 B1 | * 1/2002 | Alam et al. ............... | 715/523 |
| 6,457,030 B1 | * 9/2002 | Adams et al. ............ | 715/523 |
| 6,463,440 B1 | * 10/2002 | Hind et al. ............... | 707/102 |
| 6,470,349 B1 | * 10/2002 | Heninger et al. .......... | 707/101 |
| 6,519,617 B1 | * 2/2003 | Wanderski et al. ........ | 715/513 |
| 6,589,291 B1 | * 7/2003 | Boag et al. ............... | 715/513 |

FOREIGN PATENT DOCUMENTS

WO    WO 99/19819    4/1999    ........... G06F/17/60

OTHER PUBLICATIONS

Kyle Brown, Using Java Server Pages—Servlets made simple, Aug. 1999, pp. 1–6.*
Extensible Stylesheet Language (XSL) Specification W3C Working Draft, Apr. 21, 1999, 1–19.*

* cited by examiner

Primary Examiner—Stephen S. Hong
Assistant Examiner—Matthew Ludwig
(74) Attorney, Agent, or Firm—Marcia L. Doubet; Jeanine S. Ray-Yarletts (57) ABSTRACT

A method, system, and computer program product for using Java Server Pages to enable transcoding the content of a document requested by a client, in order to tailor the output document according to application-specific characteristics. In particular, the present invention enables the JSP author to override input source request characteristics and to specify transcoding hints to be used by a transcoding filter for selecting an appropriate style sheet.

19 Claims, 6 Drawing Sheets

```
                                                             511      512       513        514
         <!DOCTYPE HTML PUBLIC "-//IETF//DTD HTML//EN" >
         <HTML>
         <HEAD>
         <TITLE>Payment Selection</TITLE>
         </HEAD>
510      <!--@ transcode contour="h2+body" transaction="hasform" -->
         <BODY BGCOLOR="#FFFFFF">
         <H2>Payment Transaction</H2> 540
         <form method=get
         action="processaccount.cgi?transaction=5259642">
         <p>
         CPL $60<br>
         Select account from which to pay CPL<br>
         <selectname="account">
520      <option value="005"> checking
         <option value="004"> savings
         <option value="003"> money manager
         <option value="009"> stretch pay
         </select>
         <input type=submit>
         <input type+reset>
         </form>
         <H2>Checking</H2> 541
         <ul>
         <li>$100.00</li>
         </ul>
         <H2>Savings</H2> 542
         <ul>
         <li>$200.00</li>
         <li>Number of transactions this month  3</li>
530      </ul>
         <H2>Money Manager</H2> 543
         <ul>
         <li>$300.00</li>
         <li>Number of transactions this month 4</li>
         </ul>
         <H2>Stretch Pay</H2> 544
         <ul>
         <li>3 month payments of $20.00</li>
         <li>Credit charge $5.00</li>
         <li>Stretch Pay Credit Balance $80.00</li>
         </ul>
         </HTML>
```

```
<? XML VERSION="1.0" ?>
<!--DOCTYPE WML PUBLIC "-//WAPFORUM//DTD WML 1.0//EN
    "http://www.wapforum.org/DTD/wml.xm"-- >

<WML>
<CARD>
<p>
<do type="accept">
<go
href="processaccount.cgi?transaction=5259642?account=$(account)$amp"/>
</do>
<p>
CPL $60 <br>
Select account from which to pay CPL<br>
<select name="account">
<option value="005"> checking
<option value="004"> savings
<option value="003"> money manager
<option value="009"> stretch pay
</select>
</CARD>

<CARD NAME="top" STYLE="LIST" TITLE="Payment Transaction">
<A>checking<GO URL="#checking"/></A>
<A>savings<GO URL="#savings"/></A>
<A>moneymanager<GO URL="#moneymanager"/></A>
<A>stretchpay<GO URL="#stretchpay"/></A>
</CARD>
<CARD NAME="checking" STYLE="LIST" TITLE="Checking">
<A>$100.00</A>
</CARD>
<CARD NAME="savings" STYLE="LIST" TITLE="Savings">
<A>$200.00</A>
<A>Number of transactions this month=3</A>
</CARD>
<CARD NAME="moneymanager" STYLE="LIST" TITLE="Money Manager">
<A>$300.00</A>
<A>Number of transactions this month=4</A>
</CARD>
<CARD NAME="stretchpay" STYLE="LIST" TITLE="Stretch Pay">
<A>3 month payments of $20.00</A>
<A>Credit charge $5.00</A>
<A>Stretch Pay Credit Balance $80.00</A>
</CARD>
</WML>
```

ACHIEVING APPLICATION-SPECIFIC DOCUMENT CONTENT BY TRANSCODING USING JAVA SERVER PAGES

BACKGROUND OF THE INVENTION

1. Field of the Invention

The present invention relates to a computer system, and deals more particularly with a method, system, and computer program product for using Java Server Pages to achieve application-specific document content. The disclosed technique enables the Java Server Page application author to have more control over the content of a client-requested document generated by this application.

2. Description of the Related Art

"Transcoding" is a technique well known in the art. In general, a transcoder translates or transforms the content of a document or file, resulting in creation of a different document or file. In the Internet and World Wide Web environments, transcoding is used in a number of ways. As one example, transcoding may be used to transform a full-color graphic image that is embedded within a Web document into a grayscale image, in order to reduce the size of the information content before transmitting it from a server to a client that has requested the document. As another example, an HTML (HyperText Markup Language) document may be translated into an XML (Extensible Markup Language) document before transmitting it to a client. Many other examples of transcoding can be envisaged by one of skill in the art.

Servlets have proven to be a powerful tool in generation of dynamic Web content. A servlet is a program typically written in the Java object-oriented programming language. (Java is a trademark of Sun Microsystems, Inc., referred to hereinafter as "Sun".) A servlet is created in a way that allows it to be easily added to the code already running on a server, and is intended to extend the functionality provided by the server. A servlet typically implements code to perform a specific task, such as retrieving information from a particular type of database, performing some business application function, or performing a particular type of transcoding operation. When used for transcoding, a servlet may operate upon a static document (that is, a document having a predefined content) to change the content of this document into another form, in the manner discussed above (i.e. operating upon images, translating from one syntax to another, etc.) Servlets may also be used to dynamically generate the content, or portions of the content, for a requested Web page. For example, run-time information may be obtained by an executing servlet, such as the identification of the client requesting the document; this dynamically-obtained information can then be used when generating the output document to be returned to the client (such as inserting a client-specific greeting in the document; tailoring the document format according to stored preferences for this client; etc.).

Sun Microsystems, Inc. has recently defined a server-side scripting language known as "javaServer Pages", or "JSP". This JSP language provides access to the servlet API (Application Programming Interface), the Java API, and the JavaBeans API. The JSP model simplifies the development of servlets by enabling servlet code to use a scripting paradigm, thereby enabling software developers to more easily build applications that generate Web content dynamically. The deployment of servlets is also made simpler, as all that is required when using JSP is to invoke a Web document (such as an HTML page or XML document) that contains JSP code embedded within it. The referenced servlet code will then be invoked automatically, by the JSP processing engine, as the Web document is being processed. (As is known in the art, invocation of a Web page is typically done by transmitting an HTTP, or HyperText Transfer Protocol, GET request from a client to a Web server, where this GET request specifies the Uniform Resource Locator, or URL, used to locate the desired page.) By incorporating the "Write Once, Run Anywhere" vision of the Java programming language, JSPs allow servlets to be defined by scripts that may be easily accessed by Web application servers. A further advantage of JSPs is that the servlet registration process, which varies from one server to another, is no longer required. ("JavaServer Pages", "JSP", "Java Beans", and "Write Once, Run Anywhere" arm trademarks of Sun Microsystems. Inc.)

Under this distributed computing model where transcoding is performed by servlets, the transcoding engine is a filter in the output stream of the application server (or Web server). This transcoding engine typically has access to characteristics about the source of the input request. (These characteristics are also referred to herein as the "target context" of a requested document, as the requester of the document is also typically the target of the output document.) Examples of the input source characteristics are: the type of user agent (e.g. a browser) from which a document was requested; the type of device on which the user agent is operating; the type of network connection over which the requesting device is connected; etc. Some aspects of this input source characteristic information may be available to a servlet operating at the Web server from which a requested document is being deployed; other aspects of the information may be available only at intermediaries in the distributed network (such as the gateway into a wireless or wired network, transcoding proxies, or transcoding servers) in a complex delivery chain between this deploying Web server and the requesting client. The transcoding engine may use these input source characteristics to choose the type of transformation it will perform on the output document, in order to transform the requested content into a form adapted specifically to the target environment in which it will be rendered for the requesting user. The filter can exist anywhere in the overall output network path to the requesting device, as stated above, but an ideal location is at the application server itself. When the filter is located at the application server, it can be coupled to the application generating the output document, enabling high-speed, efficient transcoding.

While there are many embodiments of transcoding possible, as has been stated, one which has emerged as significant in the enterprise computing marketplace is built using an Extensible Stylesheet Language ("XSL") processor which uses an XSL style sheet to transform an XML document into almost any target format—including a new XML document. U.S. Pat. No. 6,463,440 (Ser. No. 09/287, 988, filed Apr. 8, 1999), titled "Retrieval of Style Sheets from Directories Based Upon Partial Characteristic Matching" (hereinafter, "the referenced invention"), discloses a technique whereby an appropriate XSL style sheet can be dynamically selected and retrieved for use by an XSL transcoding engine in order to tailor an output document to the characteristics of the source of the input request. (Refer to "Extensible Stylesheet Language (XSL), W3C Working Draft 21 April 1999" and "XSL Transformations (XSLT), Version 1.0, W3C Working Draft 9 July 1999", which are available on the Web at http://www.w3.org/TR/WD-xsl and http://www.w3.org/TR/WD-xslt, respectively, for more information on using XSL for formatting and transforming documents.)

One of the limiting factors of this transcoding model to date is that only the input source request characteristics are used for style sheet selection, and thus to influence the content of the output document, along with very limited information about the characteristics of the application generating the output document. In particular, only the Document Type Definition ("DTD") of the XML document being transformed is available as this type of application characteristic for use by the transcoding filter. Typically, an entire family of different applications will share a single DTD, yet the transformation to be performed at the transcoding filter would ideally be modified based upon application-specific characteristics. For example, a consortium of banks might define a single DTD for all banking products, such as: statements for savings accounts, checking accounts, loans, or certificates of deposit; monthly account statements; loan requests; account balance inquiries; etc. Thus, the DTD provides only a high-level, generic means of influencing the output document. As will be obvious, the type of information that would preferably be generated by the application for a loan request form is quite different than what would be generated for a monthly statement. Another example of the advantage of using application-specific characteristics to transcode a document can be seen in the scenario where a transcoding filter is processing an HTML document, converting the input page into an XML document using a generic HTML-to-XML transcoding process where the XML document is then processed by applying XSL style sheets in an XSL engine. In this scenario, a single DTD is the only application characteristic available to the transcoding process; hence, all HTML web applications using this scenario would receive the same generic transformations (plus the ability to use a given set of input request characteristics to further transform the output for the target context).

In view of the advantageous aspects of using JSPs as discussed above, it would be desirable to incorporate JSPs in transcoding environments. There is currently no known technique for providing this capability. Accordingly, what is needed is a technique with which a JSP author can specify application-specific characteristics to be used in the transcoding process, enabling the transcoding engine to generate output that is more precisely tailored for the requesting user.

SUMMARY OF THE INVENTION

An object of the present invention is to provide a technique for incorporating application-specific characteristics in the transcoding process.

Another object of the present invention is to provide this technique whereby the JSP author can more precisely control the output generated by his application in response to a particular client request.

Yet another object of the present invention is to provide this technique by providing a capability for the JSP author to override input request source information.

A further object of the present invention is to provide this technique by providing a capability for the JSP author to insert additional application-specific characteristics into a document to be transcoded.

Another object of the present invention is to provide this technique whereby the overridden context and/or the inserted characteristic information can be used to select an appropriate style sheet for the transcoding process.

Still another object of the present invention is to provide this technique in a backward-compatible manner, such that existing style sheets continue to function properly.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for use in a computing environment, for achieving application-specific document content in the transcoding environment using Java Server Pages. This technique further comprises: retrieving an input Java Server Pages (JSP) document representing a response to a user request, the input document specifying one or more transcoding directives, and executing a JSP engine adapted to processing the transcoding directives. Executing the JSP engine preferably further comprises: locating the transcoding directives in the input document, each of the located transcoding directives comprising one or more overriding keyword/value pairs; determining a target context of the user request, the target context comprising one or more context keyword/value pairs; comparing each of the overriding keyword/value pairs to the context keyword/value pairs; and replacing a context value from a selected one of the context keyword/value pairs with an override value from a selected one of the override keyword/value pairs when the selected context pair and the selected override pair have a matching keyword value. After executing the JSP engine, the context keyword/value pairs, as modified, are used to generate a tailored output version of the input document.

Using the context keyword/value pairs may further comprise executing a transcoding filter. The input document may further comprise one or more transcoding hints, and the technique may further comprise applying these transcoding hints to further refine the tailored output version.

Applying the transcoding hints may further comprise: using the transcoding hints to select one or more appropriate style sheets; and executing a transcoding filter which applies the selected style sheets to the input document. Or, applying the transcoding hints may further comprise: using the transcoding hints and the context keyword/value pairs, as modified by the replacing operation, to select one or more appropriate style sheets; and executing a transcoding filter which applies the selected style sheets to the input document. The style sheets may be specified in an Extensible Stylesheet Language (XSL) notation.

The present invention will now be described with reference to the following drawings, in which like reference numbers denote the same element throughout.

BRIEF DESCRIPTION OF THE DRAWINGS

FIG. 6 illustrates an example output document created by a transcoding filter using the application-specific characteristic information provided according to the present invention, resulting in a document having a finer-grained application-specific transformation than is available in the prior art.

DESCRIPTION OF THE PREFERRED EMBODIMENT

Figure 1:
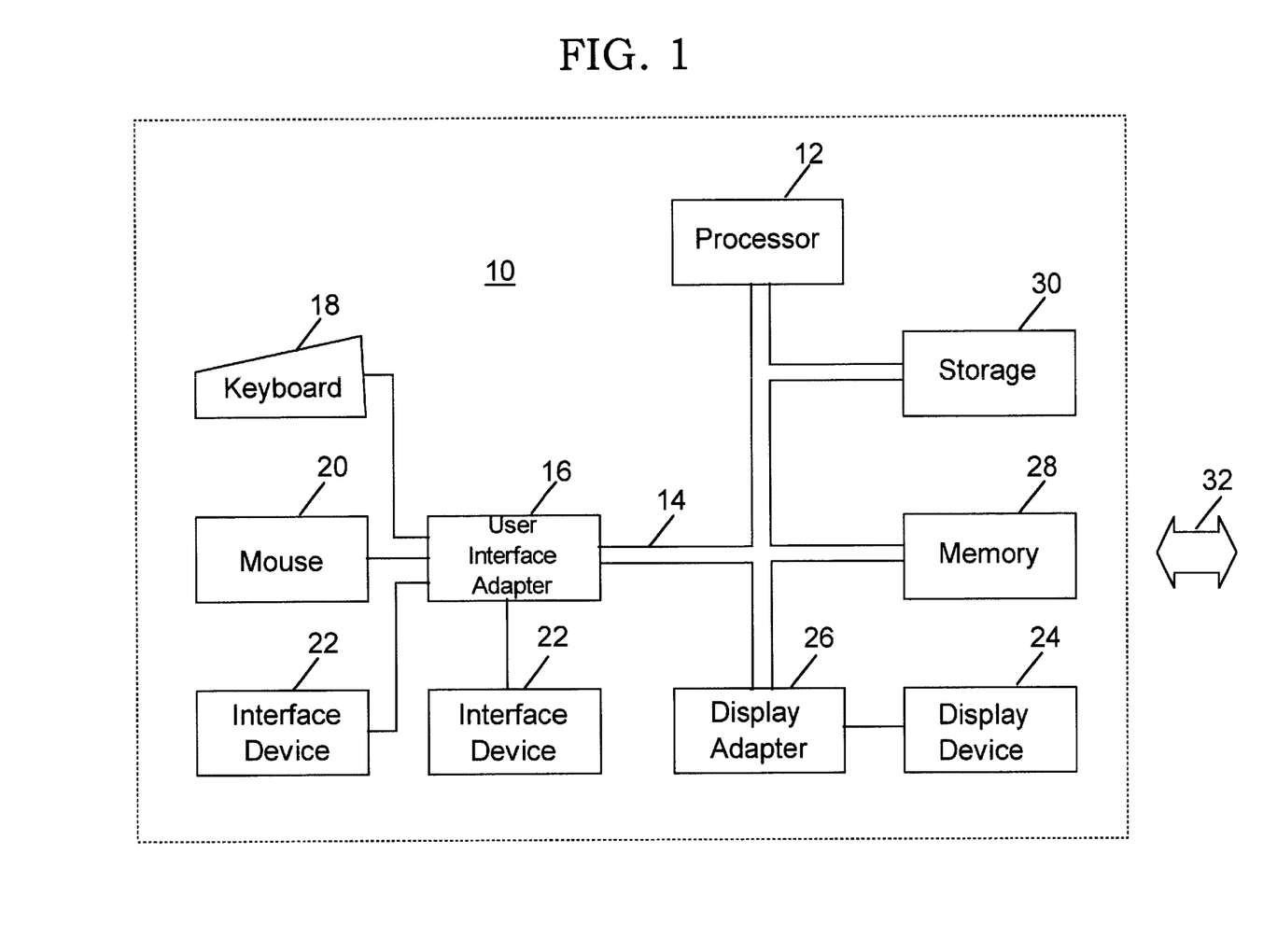
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
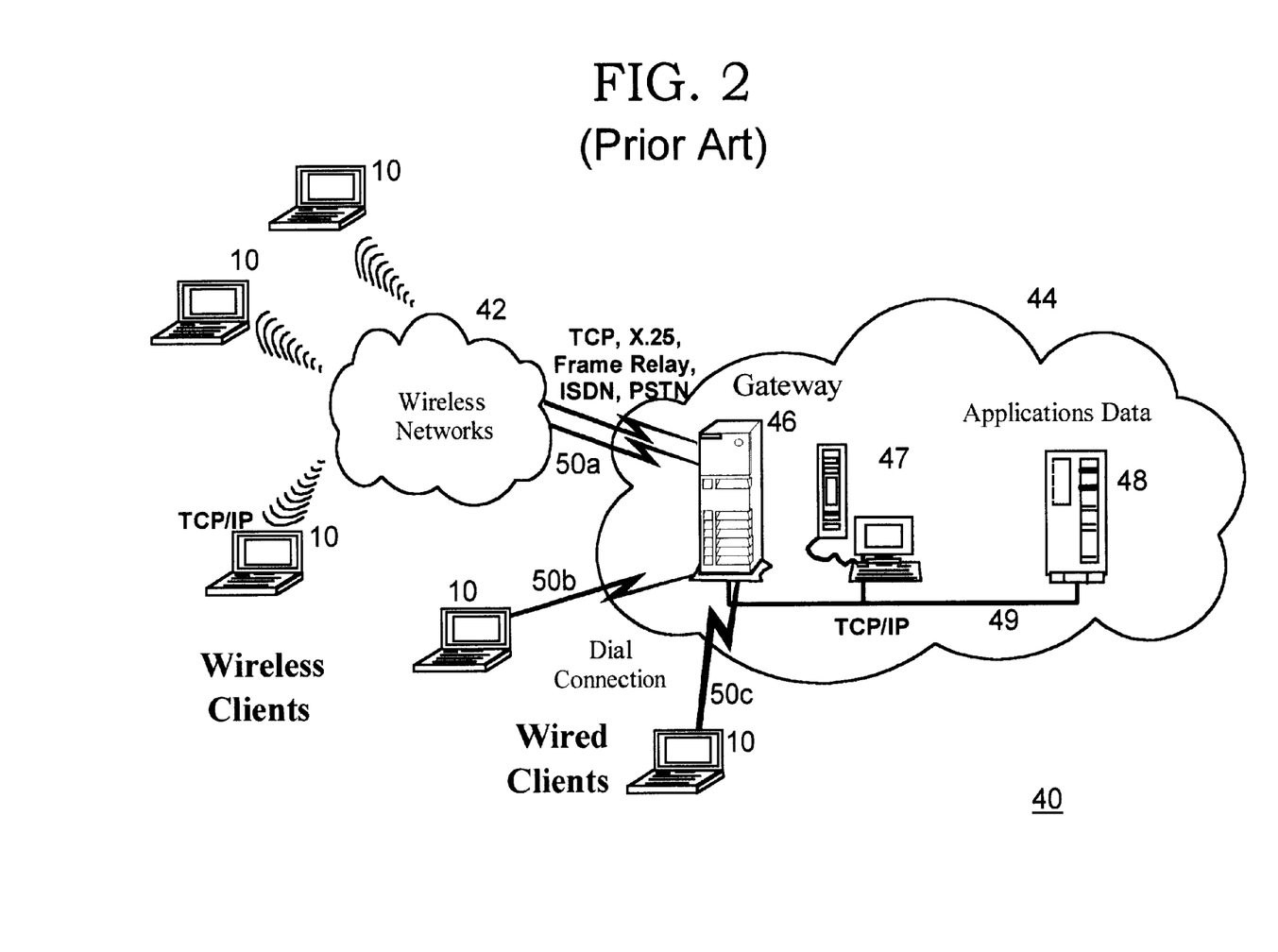
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from the International Business Machines Corporation ("IBM"), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of a server such as server 47 or an intermediary such as gateway 46 (hereinafter referred to simply as an intermediary) from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing (and optionally communication) capabilities. The remote server and the intermediary, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiment, the present invention is implemented as one or more computer software programs. The software may operate entirely on an application server, or partly on an application server and partly on an intermediary in a network, as one or more modules (also referred to as code subroutines, or "objects" in object-oriented programming) which are invoked upon request. For ease of reference, the term "server" may be used herein to refer to either of these devices as the device on which transcoding is performed before sending a document to a client. The application server and intermediary may be providing services in an Internet environment, in a corporate intranet or extranet, or in any other network environment.

The present invention defines a novel technique for enabling a JSP application author to specify application characteristics that will allow a transcoder to more precisely tailor an output document for its intended receiver. This transcoding process may occur at an application server which serves the requested document, or at an intermediary in the delivery chain between a client that has requested stored data and the server application which has retrieved the requested information. Intermediaries commonly apply various types of translations and/or transformations based upon input source characteristics (i.e. target context). For example, XML is widely adopted as an industry standard for the publishing and exchange of data through networks such as the Internet. When data is being transmitted in the form of an XML document, a common translation is to reformat the document into a different markup language, where the target markup language is better suited to the target context. Suppose the requesting user has requested data from his cell phone over a wireless connection. In this case, the target context comprises the identification of the user; his limited-function, constrained device; the wireless network connection; and the browser or other application software from which the user issued his request. It may be determined that this user's browser does not support XML, but does support WML ("Wireless Markup Language"), which is a version of XML developed for the purpose of document presentation for users of wireless computing devices. Thus, the intermediary would perform an XML to WML translation, and send the resulting WML document to the requesting user. A typical means of performing this type of translation, as well as many other translations and transformations, is by applying a style sheet to the input document.

The referenced invention disclosed a technique for tailoring document content for its target context by retrieving a particular style sheet (or sheets) that will provide a transformation that is most appropriate for a particular set of input request source characteristics. In this referenced invention, a technique was defined for associating characteristics with style sheets by declaring a set of keyword/value pairs, populating a search engine with these pairs, and retrieving an appropriate style sheet by specifying a pattern which includes one or more of the characteristics. The technique of this disclosure is incorporated herein by reference, and is preferably used with the present invention. By extending this same style of characteristic usage from input request source characteristics (as defined in the referenced invention) to application-specific characteristics (as defined by the present invention), the same mechanisms defined in the referenced invention can be used by the transcoding engine to select a transformation based upon both the input request characteristics and the application-specific characteristics specified by the JSP author.

Two novel techniques are disclosed herein for enabling a JSP author to specify application-specific information for more precisely controlling the output pages generated by his application. The first technique is referred to herein as a "transcoding directive". The JSP language is defined with several directives, such as an "include directive" and a "page directive". Use of the term "directive" implies that the JSP processing engine is being directed to perform a specific task. The transcoding directive of the present invention extends this list of predefined directives. With the transcoding directive, the JSP engine is directed to process the associated input for later use by a transcoding filter, as will be described in detail below, with reference to FIG. 3. The second technique is referred to herein equivalently as "application characteristic markup" or "transcoding hints". A transcoding hint is information inserted into a document by the execution of a JSP, where this inserted information is intended to be processed subsequently by a transcoding filter. The manner in which a transcoder uses transcoding hints according to the present invention will be discussed below with reference to FIG. 4.

The preferred embodiment of the syntax for a transcoding directive follows the syntax used for existing directives in the JSP language, which is to precede the directive name by the syntax "<%@" and to follow the directive's parameter list with the syntax "%>" when using HTML, and to precede the directive name by "<jsp:directive." and follow it with a closing tag delimiter "/>" when using XML. Thus, when coded in an HTML page the transcoding directive would appear as:

<%@transcode user [transcoding directive parameter list]%>

The parameter list is preferably specified as keyword/value pairs, where each keyword is separated from its associated value by an "=" sign, the value is enclosed in double quotes, and each pair is separated from one another using white space as a delimiter. When coded in an XML page, the transcoding directive syntax would be:

<jsp:directive.transcode [transcoding directive parameter list]/>

Note that this syntax is to be processed by the JSP engine (see FIG. 3), as augmented for purposes of the present invention.

The function of the transcoding directive is to enable the JSP author to override one or more of the input source request characteristics. Such input source characteristics are typically obtained from the header fields of the HTTP request with which the page was requested. The JSP author may wish to override one or more of these values according to the needs of his application, using values of his choosing in view of the specific processing his application is performing. As an example of overriding an input source characteristic, the syntax <%@transcode user="guest@www.ibm.com"%> may be coded into a JSP page by the JSP author to indicate that the user identity is to be forced to "guest@www.ibm.com" (rather than the identity derived from the input request) when the HTML document generated by the JSP application is passed through a transcoding filter. The equivalent syntax for an XML page would be <jsp:directive.transcode user="guest@wwww.ibm.com"/>

This overriding technique may be used for any input source characteristic.

The preferred embodiment of the syntax for a transcoding hint also uses one syntax for HTML, and another syntax for XML, to align with the syntax of the respective languages. The transcoding hints are intended to be processed by a transcoding filter. As stated earlier, the transcoding filter may be co-resident with the JSP engine, or it may alternatively be located at an intermediary in the network which receives and then transcodes the document generated by the JSP engine. Because of this possibility of the transcoder being located in the network, it is necessary for the syntax of the transcoding hints to be able to flow through other intermediaries in the network path as a valid document markup. (That is, the syntax must appear valid to the intermediaries in the path before reaching the transcoding filter—after processing by the filter, the transcoding hint markups will have been removed.) Thus, the preferred embodiment for inserting a transcoding hint into an HTML document is to overload the comment syntax, such that the transcoding hints have the form:

<!--@transcode [application characteristic list]-->

As with the transcoding directive parameter list, the transcoding hint parameter list is preferably specifed as keyword/value pairs, where each keyword is separated from its associated value by an "=" sign, the value is enclosed in double quotes, and each pair is separated from one another using white space as a delimiter. The preferred embodiment of the syntax for coding a transcoding hint in an XML page is:

<suggestion:transcode[transcoding directive parameter list]/>

The function of a transcoding hint is not to override an input characteristic, but rather to suggest application characteristics that may be used in addition to input characteristics when selecting an appropriate style sheet for use in the transcoding process. As with the transcoding directive, the needs of each particular application will determine what types of transcoding hints may be appropriate in a given document to be transcoded. Thus, the JSP author may specify hints according to his knowledge of the document being generated and how a style sheet might advantageously tailor the output document. As an example of specifying a transcoding hint, the JSP author might write code to insert the following syntax into an HTML document generated by his application:

<!--@transcode reportstyle="catalog"--> to indicate that the best rendering of this document by the transcoder will be with an XSL style sheet which has a matching characteristic attribute of reportstyle="catalog". The equivalent syntax for an XML page would be <suggestion:transcode reportstyle="catalog"/>

The preferred embodiment of the present invention will now be discussed in more detail with reference to FIGS. 3 through 6. A simple example will be used to illustrate the benefits as well as the implementation of the present invention.

Figure 3:
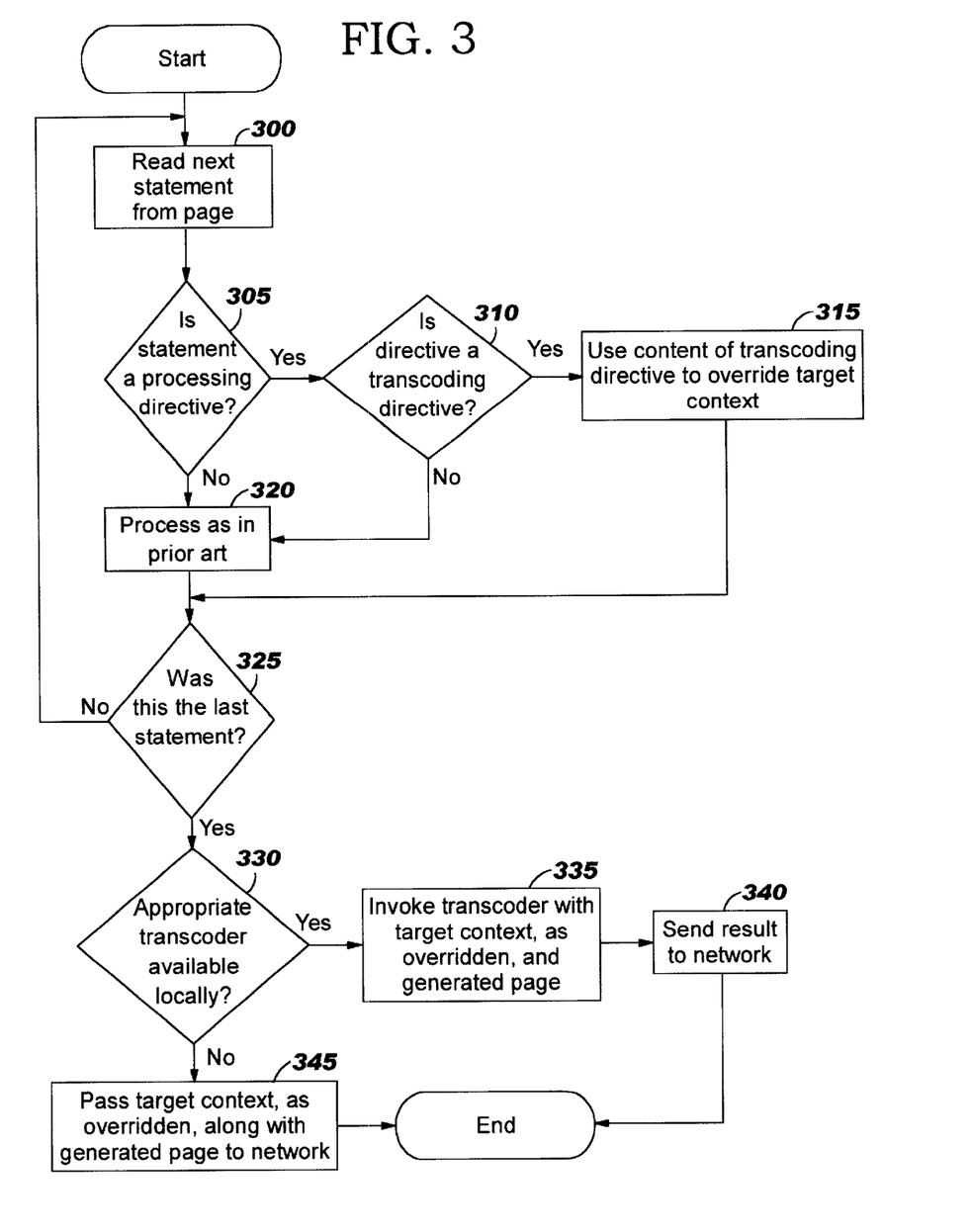
FIG. 3 depicts a flow chart depicting the logic with which a JSP engine may be extended according to the preferred embodiment of the present invention.

FIG. 3 depicts the logic with which a JSP engine may be extended to process transcoding directives, according to the preferred embodiment. As is known in the art, the processing of the JSP engine is invoked after a client has requested a particular Web document, and the requested document (which is a Java Server Page) is located at the Web server responsible for responding to the client request. FIG. 3 does not describe the existing logic of the JSP engine, but rather those extensions which are preferably used for the present invention. It will be obvious to one of ordinary skill in the art how these novel extensions may be incorporated into the logic flow of an existing JSP engine. The process begins at Block 300, where the JSP engine reads a statement from the Java Server Page. Block 305 asks whether this statement specifies a processing directive. If so, Block 310 then asks whether it is a transcoding directive of the present invention. If either the statement is not a directive ("No" at Block 305) or it is not a transcoding directive ("No" at Block 310), control transfers to Block 320, and the statement is processed according to the prior art.

If the statement is a transcoding directive, it is processed by Block 315. Preferably, Block 315 locates the keyword from the transcoding directive, and then determines whether there is a matching keyword in the input source characteristics. If this keyword is found in the input source, the value from the input source is then overridden with the value specified by the JSP author on the transcoding directive. If the keyword is not found in the processing of Block 315, the keyword and value from the transcoding directive may simply be stored in a list of override pairs, where the actual overriding process (i.e. locating the keyword in the input source characteristics, and replacing the associated value) is performed at a later point in the processing flow, such as following a "Yes" result at Block 325.

Block 325 is reached after processing the input statement which was read by Block 300. Block 325 then checks to see if this was the last statement in the JSP. If not, control returns to Block 300 to iteratively process the next statement. Otherwise, upon reaching the end of the input file, Block 325 has a positive result and processing continues at Block 330.

Upon reaching Block 330, the output document has been generated by the JSP engine. Any transcoding directives from the Java Server Page have been located and processed. Any transcoding hints specified by the JSP author have been inserted into this generated output document. (Note that the JSP engine does not need to be modified to enable writing the transcoding hints into the document: existing "write" operations may be used for this purpose.) The JSP engine checks at Block 330 to see if an appropriate transcoding filter is available locally. (Transcoding and other output filters may be registered with server software using techniques which are known in the art. Thus, Block 330 may be implemented by checking for the presence of such a filter.) If so, then the transcoder is invoked at Block 335, passing the target context information (with the overridden values as processed by Block 315) and the document generated by the JSP. The output of the local transcoding operation (which is a document no longer containing transcoding hints, these hints having been used and removed by the local transcoder) is then sent to the network, to be delivered to the requesting client, in Block 340. (See FIG. 4 for a description of the transcoding operation.) If no local transcoding filter is available, Block 345 may simply pass the document generated by the JSP (which may contain transcoding hints) into the network for processing by a network-resident transcoding filter (see FIG. 4). Alternatively, Block 345 may inject the target context override information (in the form of the "<%@ transcode" or "jsp:directive.transcode" markups which were processed by Block 315) into the generated document (which may also contain transcoding hints) before sending the resulting document into the network. The processing of FIG. 3 ends following completion of either Block 340 or Block 345.

Figure 4:
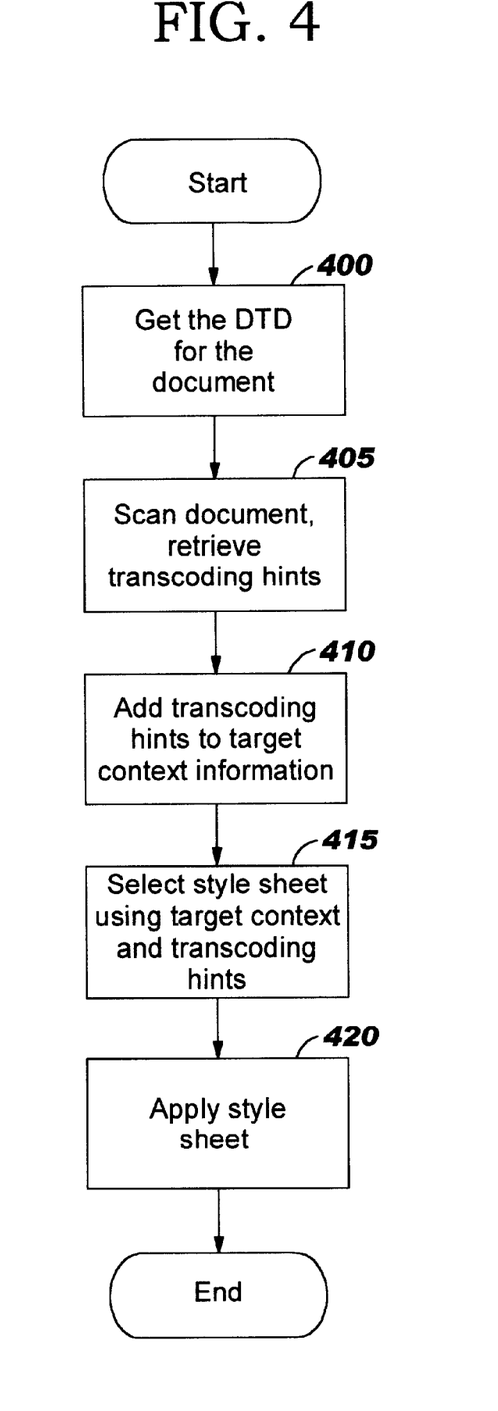
FIG. 4 depicts a flow chart depicting the logic with which a transcoding engine uses the application-specific characteristics provided for style sheet selection according to the preferred embodiment of the present invention.

FIG. 4 illustrates the logic with which a transcoding filter (whether located at a network intermediary, or co-resident with the JSP engine) advantageously uses the overridden context information and transcoding hints of the present invention to create a document having a finer-grained application-specific transformation than is available in the prior art. The process begins at Block 400, where the DTD associated with the input document being transcoded (i.e. the document generated by the JSP engine, including any modifications resulting from operation of FIG. 3) is retrieved, as in the prior art. Block 405 then scans the input document, searching for transcoding hints. For a network-resident transcoding filter, this process also comprises scanning the input document for target context override markups, i.e. transcoding directives (which may have been inserted during the processing of Block 345). The keywords and values located in this scan operation are then added to the target context information received as input, at Block 410. Any override markups detected by a network-resident transcoding filter at Block 405 are also applied to override the corresponding target context values at this point (as described above with reference to Block 315). At Block 415, a search string is created from the result of Block 410, and used to query a repository of stored style sheet characteristics, preferably using the approach defined in the referenced invention. The retrieved style sheet (or style sheets) is then applied (Block 420) by the XSL processing engine, according to the prior art. The processing of FIG. 4 then ends, after which the document which has been tailored according to the application-specific characteristics specified by the JSP author is sent on along the delivery path to the requesting client.

Figure 5:
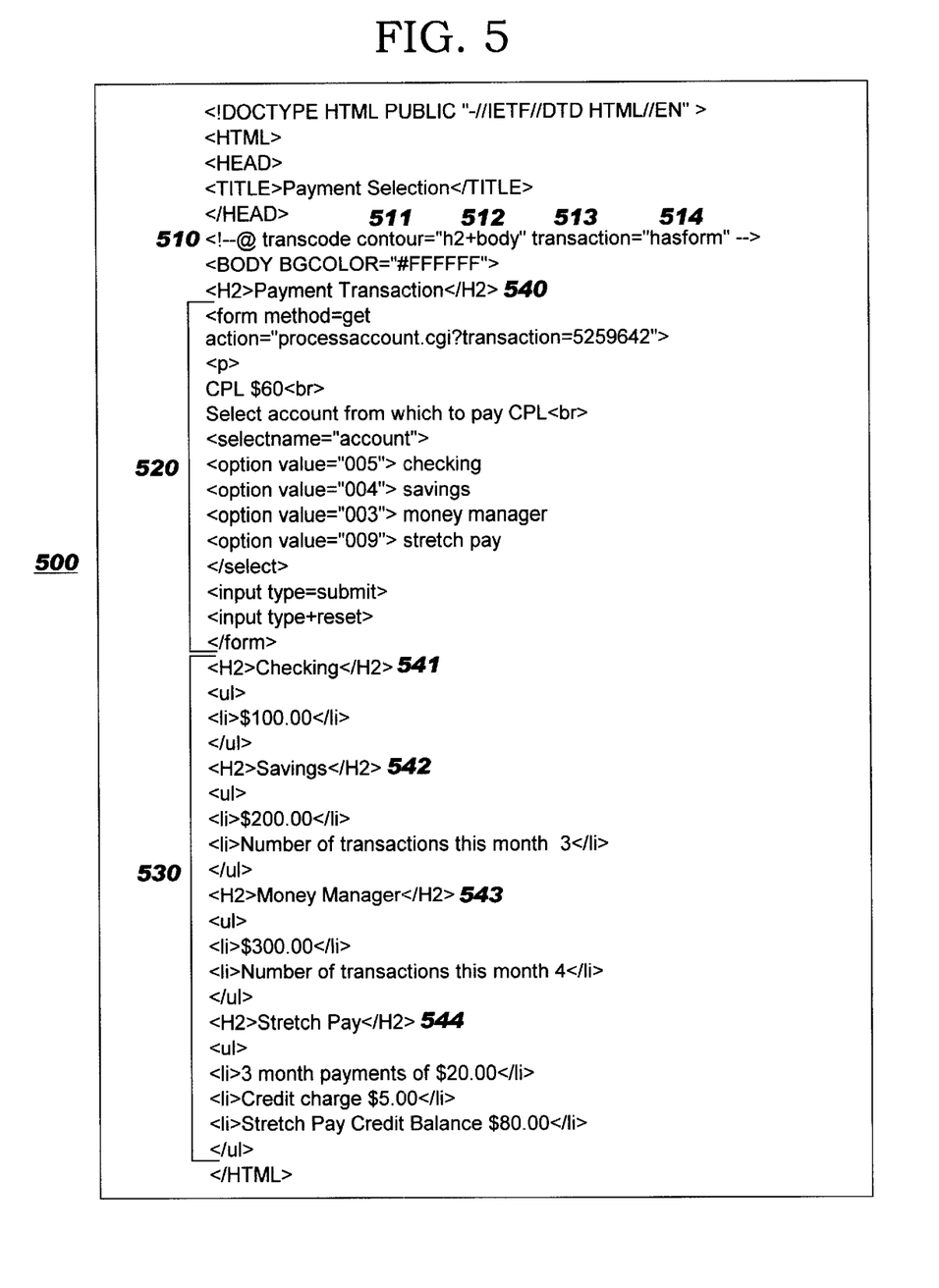
FIG. 5 illustrates a simple output document resulting from execution of a JSP, where this output document includes application characteristics inserted according to the present invention.

FIGS. 5 and 6 depict example documents to further clarify the processing of the preferred embodiment of the present invention. FIG. 5 represents the output of a JSP which generates HTML syntax. Because the transcoding directives have been removed according to the processing of FIG. 3, this JSP output document illustrates only the presence of transcoding hints. This example document 500 resulted from a banking application, where a banking customer's account information has been retrieved and formatted for display with a browser. In this example, the JSP has generated a document which contains a form 520 for payment selection, in addition to the customer's account balances and other information (depicted as element 530). The transcoding hint 510 uses the comment style markup described earlier for use with HTML documents. In this transcoding hint 510, the keyword "contour" 511 has the value "h2+body" 512, which for this hypothetical example would be a keyword/value pair associated with a style sheet which partitions a document by treating each level-2 heading as a stand-alone information unit. Also in transcoding hint 510, the keyword "transaction" 513 has the value "hasform" 514, to select a style sheet which is adapted to processing document pages containing requests for user input (i.e. the form specified in this HTML page at 520).

FIG. 6 shows an example output document 600 that may be created when the transcoding filter (or filters) which have been applied to document 500 converted the HTML syntax to WML (e.g. after determining from the target context that the requesting user is using a pager or screen-phone device and is connected over a wireless network), and also utilized the "contour" and "hasform" hints for formatting the document to be presented to the customer. The input form 520 has been converted by the style sheet into the WML syntax for accepting user input (element and each level-2 heading (540, 541, 542, 543, 544) of the HTML document has been converted into a separate card (620, 621, 622, 623, 624, respectively) in the WML deck 600.

As has been demonstrated, the present invention provides advantageous techniques for enabling a JSP author to more precisely tailor the output document generated by his application according to application-specific characteristics. In particular, the present invention enables the JSP author to override input source request characteristics and to specify transcoding hints to be used by a transcoding filter for selecting an appropriate style sheet. The transcoding hints, which may need to flow through intermediaries in the network, are designed with a backward compatible syntax such that existing document processors will simply ignore them.

Although the preferred embodiment has been described as using XSL style sheets, style sheets in other notations may be used instead of XSL (e.g. Document Style Semantics and Specification Language, or DSSSL, which is an International Standard ISO/IEC 10179: 1996) without deviating from the inventive concepts of the present invention. Similarly, while the transcoding directive and application-characteristic markup syntax has been defined herein for use with HTML pages and XML documents, this syntax may be adapted to documents encoded in other notations having similar semantics.

While the preferred embodiment of the present invention has been described, additional variations and modifications in that embodiment may occur to those skilled in the art once they learn of the basic inventive concepts. Therefore, it is intended that the appended claims shall be to include both the preferred embodiment and all such variations and modifications as fall within the spirit and scope of the invention.

We claim:

1. A computer program product embodied on one or more computer readable media readable by one or more computing systems in a computing environment, for achieving application-specific document content using Java Server Pages, comprising:

computer-readable program code means for retrieving an input Java Server Pages (JSP) document representing a response to a user request, said input document specifying (1) one or more transcoding directives, wherein each of said transcoding directives comprises one or more overriding keyword/value pairs, each of said overriding keyword/value pairs specifying application-specific information for overriding corresponding information of a target context that is applicable to said user request and (2) one or more transcoding hints, each of said transcoding hints specifying information usable or identifying one or more style sheets that are applicable to said input document;

computer-readable program code means for processing said one or more transcoding directives, further comprising:

computer-readable program code means for locating said one or more transcoding directives in said input document;

computer-readable program code means for determining said target context that is applicable to said user request, said target context comprising one or more context keyword/value pairs; and computer-readable program code means for comparing each of said overriding keyword/value pairs to said context keyword/value pairs and replacing a context value from a selected one of said context keyword/value pairs with an overriding value from a selected one of said overriding keyword/value pairs when an overriding keyword of said selected overriding pair corresponds to a context keyword of said selected context pair;

computer-readable program code means for using said context keyword/value pairs, as modified by said computer-readable program code means for comparing and replacing, to generate a tailored output version of said input document; and computer-readable program code means for using said transcoding hints to search for style sheets to use in further refining said tailored output version.

2. The computer program product according to claim 1, wherein said computer-readable program code means for using said context keyword/value pair further comprises computer-readable program code means for executing a transcoding filter that uses, as an input to said execution, said context keyword/value pairs as modified by said computer-readable program code means for comparing and replacing.

3. The computer program product according to claim 1, further comprising:

computer-readable program code means for retrieving style sheets located by said computer-readable program code means for using said transcoding hints; and computer-readable program code means for executing a transcoding filter which applies said retrieved style sheets to said tailored output version, thereby generating said further refined tailored output version.

4. The computer program product according to claim 1, wherein said computer-readable program code means for using said context keyword/value pairs and said computer-readable program code means for using said transcoding hints to search for style sheets are replaced by:

computer-readable program code means for using said basic hints and said context keyword/value pairs, as modified by said computer-readable program code means for comparing and replacing, to select one or more appropriate style sheets to use in transforming said input document;

computer-readable program code means for retrieving said selected style sheets; and computer-readable program code means for executing a transcoding filter which applies said selected style sheet to said input document, thereby generating a tailored output version of said input document.

5. The computer program product according to claim 1, wherein said style sheets are specified in an Extensible Stylesheet Language (XSL) notation.

6. A system for achieving application-specific document content using Java Server Pages in a computing environment, comprising:

means for retrieving an input Java Server Pages (JSP) document representing a response to a user request, said input document specifying (1) one or more transcoding directives, wherein each of said transcoding directives comprises one or more overriding keyword/value pairs, each of said overriding keyword/value pairs specifying application-specific information for overriding corresponding information of a target context that is applicable to said user request and (2) one or more transcoding hints, each of said transcoding hints specifying information usable for identifying one or more style sheets that are applicable to said input document;

means for processing said one or more transcoding directives, further comprising:

means for locating said one or more transcoding directives in said input document;

means for determining said target context that is applicable to said user request, said target context comprising one or more context keyword/value pairs; and means for comparing each of said overriding keyword/value pairs to said context keyword/value pairs and replacing a context value from a selected one of said context keyword/value pairs with an overriding value from a selected one of said overriding keyword/value pairs when an overriding keyword of said selected overriding pair corresponds to a context keyword of said context pair;

means for using said context keyword/value pairs, as modified by said means for comparing and replacing, to generate a tailored output version of said input document; and means for using said transcoding hints to search for style sheets to use in further refining said tailored output version.

7. The system according to claim 6, wherein said means for using said context keyword/value pairs further comprises means for executing a transcoding filter that uses, as an input to said execution, said context keyword/value pairs as modified by said means for comparing and replacing.

8. The system according to claim 6, further comprising:

means for retrieving style sheets located by said means for using said transcoding hints; and means for executing a transcoding filter which applies said retrieved style sheets to said tailored output version, thereby generating said further refined tailored output version.

9. The system according to claim 6, wherein said means for using said context keyword/value pairs and said means for using said transcoding hints to search for style sheets are replaced by:

means for using said transcoding hints and said context keyword/value pairs, as modified by said means for comparing and replacing, to select one or more appropriate style sheets to use in transforming said input document;

means for retrieving said selected style sheets; and means for executing a transcoding filter which applies said selected style sheets to said input document, thereby generating a tailored output version of said input document.

10. The system according to claim 6, wherein said style sheets are specified in an Extensible Stylesheet Language (XSL) notation.

11. A method for achieving application-specific document content using Java Server Pages in a computing environment, comprising the steps of:

retrieving an input Java Server Pages (JSP) document representing a response to a user request, said input document specifying (1) one or more transcoding directives, wherein each of said transcoding directives comprises one or more overriding keyword/value pairs, each of said overriding keyword/value pairs specifying application-specific information for overriding corresponding information of a target context that is applicable to said user request and (2) one or more transcoding hints, each of said transcoding hints specifying information usable for identifying one or more style sheets that are applicable to said input document;

processing said one or more transcoding directives, further comprising the steps of:

locating said one or more transcoding directives in said input document;

determining said target context that is applicable to said user request, said target context comprising one or more context keyword/value pairs; and comparing each of said overriding keyword/value pairs to said context keyword/value pairs and replacing a context value from a selected one of said context keyword/value pairs with an overriding value from a selected one of said overriding keyword/value pairs when an overriding keyword of said selected overriding pair corresponds to a context keyword of said selected context pair;

using said context keyword/value pairs, as modified by said comparing and replacing step, to generate a tailored output version of said input document; and using said transcoding hints to search for style sheets to use in further refining said tailored output version.

12. The method according to claim 11, wherein said step of using said context keyword/value pairs further comprises the step of executing a transcoding filter that uses, as an input to said execution, said context keyword/value pairs as modified by said step of comparing and replacing.

13. The method according to claim 11, further comprising the steps of:

retrieving style sheets located by said step of using said transcoding hints; and executing a transcoding filter which applies said retrieved style sheets to said tailored output version, thereby generating said further refined tailored output version.

14. The method according to claim 11, wherein said step of using said context keyword/value pairs and said step of using said transcoding hints to search for style sheets are replaced by the steps of:

using said transcoding hints and said context keyword/value pairs, as modified by said step of comparing and replacing, to select one or more appropriate style sheets to use in transforming said input document;

retrieving said selected style sheets; and executing a transcoding filter which applies said selected style sheets to said input document, thereby generating a tailored output version of said input document.

15. The method according to claim 11, wherein said style sheets are specified in an Extensible Stylesheet Language (XSL) notation.

16. The method according to claim 11, wherein said tailored output version accounts for said application-specific information of each of said selected overriding pairs.

17. A method of transcoding content in an application-specific manner, comprising steps of:

receiving a user request for content, wherein said request identifies executable logic expressed in a server-side scripting language;

executing said executable logic, responsive to receiving said request, thereby generating a dynamic version of said content, wherein said dynamic version includes one or more transcoding hints, each of said transcoding hints specifying application-specific suggestions for subsequently locating style sheets that are appropriate for transcoding said dynamic version;

subsequently using said transcoding hints to locate one or more appropriate style sheets for transcoding said dynamic version; and using said located style sheets to transcode said dynamic version in an application-specific manner.

18. A system for transcoding content in an application-specific manner, comprising:

mean for receiving a user request for content, wherein said request identifies executable logic expressed in a server-side scripting language;

means for executing said executable logic, responsive to receiving said request, thereby generating a dynamic version of said content, wherein said dynamic version includes one or more transcoding hints, each of said transcoding hints specifying application-specific suggestions for subsequently locating style sheets that are appropriate for transcoding said dynamic version;

means for subsequently using said transcoding hints to locate one or more appropriate style sheets for transcoding said dynamic version; and means for using said located style sheets to transcode said dynamic version in an application-specific manner.

19. A computer program product embodied on one or more computer-readable media readable by one or more computing systems in a computing environment, for transcoding content in an application-specific manner, comprising:

computer-readable program code means for receiving a user request for content, wherein said request identifies executable logic expressed in a server-side scripting language;

computer-readable program code means for executing said executable logic, responsive to receiving said request, thereby generating a dynamic version of said content, wherein said dynamic version includes one or more transcoding hints, each of said transcoding hints specifying application-specific suggestions for subsequently locating style sheets that are appropriate for transcoding said dynamic version;

computer-readable program code means for subsequently using said transcoding hints to locate one or more appropriate style sheets for transcoding said dynamic version; and computer-readable program code means for using said located style sheets to transcoding said dynamic version in an application-specific manner.

* * * * *

UNITED STATES PATENT AND TRADEMARK OFFICE
CERTIFICATE OF CORRECTION

PATENT NO. : 6,715,129 B1
DATED : March 30, 2004
INVENTOR(S) : Hind, John Raithel et al.

It is certified that error appears in the above-identified patent and that said Letters Patent is hereby corrected as shown below:

Column 1,
Line 59, change "javaServer" to read -- JavaServer --.

Column 2,
Line 16, change "arm" to read -- are --.
Line 17, change "Microsystems." to --Microsystems, --.

Column 12,
Line 56, change "or" (first occurrence) to -- for --.

Column 13,
Line 20, change "pair" to read -- pairs --;
Line 40, change "basic" to read -- transcoding --;
Line 49, change "sheet" to read -- sheets --.

Column 16,
Line 17, change "mean" to read -- means --;
Line 57, change "transcoding' to read -- transcode --.

Signed and Sealed this

Tenth Day of August, 2004

JON W. DUDAS
*Acting Director of the United States Patent and Trademark Office*